United States Patent

Miyaoh

[11] Patent Number: 5,961,126
[45] Date of Patent: Oct. 5, 1999

[54] METAL GASKET WITH PERIPHERAL BEAD

[75] Inventor: Yoshio Miyaoh, Tokyo, Japan

[73] Assignee: Ishikawa Gasket Co., Ltd., Tokyo, Japan

[21] Appl. No.: 08/874,627

[22] Filed: Jun. 13, 1997

[30] Foreign Application Priority Data

Jul. 2, 1996 [JP] Japan .................................. 8-172613

[51] Int. Cl.⁶ ............................................. F02F 11/00
[52] U.S. Cl. ........................................... 277/594; 277/593
[58] Field of Search .................................... 277/593, 594, 277/595

[56] References Cited

U.S. PATENT DOCUMENTS

| | | |
|---|---|---|
| 4,721,315 | 1/1988 | Ueta . |
| 5,076,595 | 12/1991 | Udagawa .................................. 277/595 |
| 5,344,165 | 9/1994 | Miyaoh et al. ........................... 277/595 |
| 5,431,418 | 7/1995 | Hagiwara et al. ..................... 277/595 X |

FOREIGN PATENT DOCUMENTS

| | | |
|---|---|---|
| 0 443 501 | 6/1991 | European Pat. Off. . |
| 0 493 953 | 12/1991 | European Pat. Off. . |
| 0 557 029 | 8/1993 | European Pat. Off. . |

*Primary Examiner*—James R. Brittain
*Assistant Examiner*—Gary Grafel
*Attorney, Agent, or Firm*—Kaensaka & Takeuchi

[57] ABSTRACT

A metal gasket for an internal combustion engine is formed of a metal plate having a first side and a second side opposite to the first side, and at least one first hole corresponding to a cylinder bore. The first hole is located closer to the first side than to the second side to thereby form a first area at the first side and a second area greater than the first area at the second side. A first bead is formed in the metal plate to extend along an entire outer periphery of the metal plate. The first bead has a first portion located at the first side and a second portion located at the second side. The first portion has a spring constant greater than that at the second portion to thereby provide a tightening pressure on the metal plate as equal as possible. When sealing devices are formed around the fluid holes, the sealing devices can be equally compressed to securely seal therearound.

12 Claims, 2 Drawing Sheets

METAL GASKET WITH PERIPHERAL BEAD

BACKGROUND OF THE INVENTION AND RELATED ART STATEMENT

The present invention relates to a metal gasket with a peripheral bead to provide as a whole a surface pressure as equal as possible.

In a cylinder head gasket for an internal combustion engine, a plurality of cylinder bores is often arranged linearly. In this case, the cylinder bores may not be arranged in the center of the gasket because of various reasons, such as arrangements of push rod holes, cam shafts and the like on one side of the engine (Japanese Utility Model Publication (KOKAI) No. 3-77053).

On the other hand, the engine is provided with water holes, oil holes, bolt holes and so on in addition to the cylinder bores. In the gasket situated between a cylinder head and a cylinder block, therefore, sealing means for the cylinder bores, water holes and oil holes are formed. In this case, since high pressure is formed inside the cylinder bores, the bolt holes are arranged around the cylinder bores to securely seal therearound. Other holes are situated near the cylinder bores, and the sealing means for other holes are compressed by the bolts for the cylinder bores.

Therefore, although the sealing means for the cylinder bores receive the relatively equal tightening pressure, the sealing means for other holes do not have equal tightening pressure. In case the cylinder bores are not located in the center of the gasket, the other holes and the sealing means thereof are not arranged symmetrically relative to the longitudinal direction of the cylinder bores, so that the sealing means for the other holes are not equally compressed. In order to securely seal around the other holes, it is preferable to provide an equal tightening pressure to the sealing means for the other holes.

In U.S. Pat. No. 4,834,399, a gasket is provided with a bead around an outer periphery of the gasket to secondarily seal around the gasket. In other patents, a bead portion away from a bolt, which receives a surface pressure less than that near the bolt, has another bead portion or is made narrow to provide a high surface pressure. However, there has not been known that the gasket is processed to provide a tightening pressure as a whole as equal as possible.

Accordingly, one object of the invention is to provide a metal gasket, which can provide a tightening pressure as a whole as equal as possible in case a hole is arranged eccentrically.

Another object of the invention is to provide a metal gasket. as stated above, wherein sealing means of fluid holes receive tightening pressures substantially equally.

A further object of the invention is to provide a metal gasket as stated above, wherein all the sealing means can be securely sealed.

Further objects and advantages of the invention will be apparent from the following description of the invention.

SUMMARY OF THE INVENTION

A metal gasket of the invention is used for an internal combustion engine. The gasket is basically formed of a first metal plate extending substantially throughout an entire area of the gasket to constitute gasket. The first metal plate has a first side, a second side opposite to the first side, at least one first hole, and second holes.

The first hole corresponds to a cylinder bore and is located closer to the first side than to the second side to thereby form a first area at the first side and a second area greater than the first area at the second side. The second holes correspond to bolt holes and are situated around the first hole.

In the invention, a first bead is formed in the first metal plate to extend along the entire outer periphery of the first metal plate. The first bead has a first portion located at the first side, and a second portion located at the second side, wherein the first portion has a spring constant greater than that at the second portion to thereby provide a surface pressure on the first metal plate as equal as possible.

In the gasket, the first hole is located closer to the first side than to the second side. Namely, the first hole is not located in the center between the first and second sides. Therefore, sealing means for the fluid holes, not sealing means for the cylinder bores, are not generally compressed equally by the bolts for sealing the cylinder bores. In this case, the first area receives the tightening pressure stronger than that at the second area.

Therefore, in the invention, the first bead is formed around the periphery of the gasket, wherein the first portion of the bead located at the first side is formed to have the spring constant greater than that at the second side. Namely, the first portion of the bead with the strong spring constant receives the strong tightening pressure, while the second portion of the bead with the weak spring constant receives the weak tightening pressure. Therefore, as a whole, the tightening pressure on the gasket becomes substantially equal. Since the tightening pressure on the gasket is equal, the sealing means around the fluid holes receive equal tightening pressure, so that the fluid holes can be securely sealed.

The first bead is a stepped bead formed of two bending portions and a flat middle portion between the two bending portions. The first portion of the first bead may have the width narrower than that of the second portion, or the height higher than that of the second portion.

In case the fluid holes and the sealing means thereof are formed in the first and second areas, the sealing means located in the first area has a spring constant greater than that located in the second area. As a result, the strong tightening pressure on the gasket can be supported by the sealing means with the strong spring constant.

In the invention, the first metal plate may be combined with one or more metal plates to form a metal laminate gasket. The first bead may be formed on any one of the metal plates. The sealing means around the cylinder bores may be formed by any conventional means, such as a regular bead or wire ring.

DETAILED DESCRIPTION OF PREFERRED EMBODIMENTS

Figure 1:
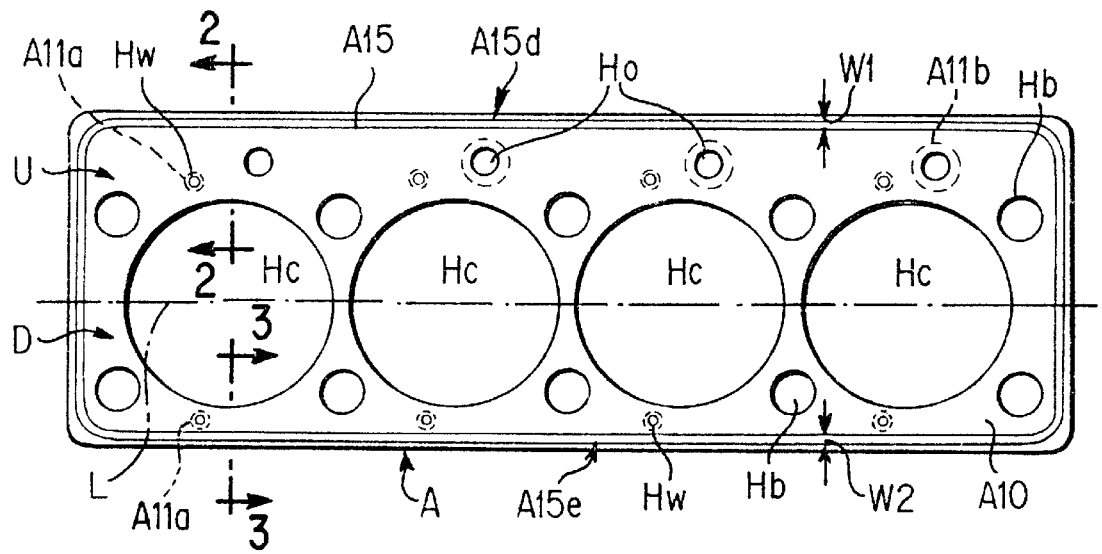
FIG. 1 is a plan view of a first embodiment of a cylinder head gasket of the invention.
Figure 2:
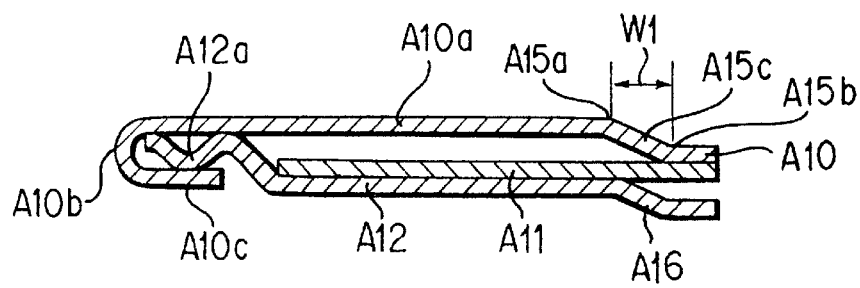
FIG. 2 is an enlarged sectional view taken along line 2—2 in FIG. 1.
Figure 3:
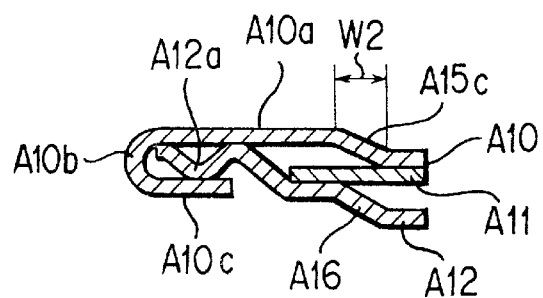
FIG. 3 is an enlarged sectional view taken along line 3—3 in FIG. 1.

With reference to FIGS. 1–3, a first embodiment A of a metal laminate gasket of the invention is explained. The gasket A is a cylinder head gasket, and includes a plurality of cylinder bores Hc, water holes Hw, oil holes Ho, and bolt holes Hb, as in the conventional gasket.

The cylinder bores Hc are arranged linearly along a longitudinal direction of the gasket. A line L extending through the centers of the cylinder bores Hc is not located in the center of the gasket and is slightly deviated downwardly. Namely, one or upper side U of the gasket forms a wide area, and the other or lower side D of the gasket forms a narrow area. The bolt holes Hb are arranged around the cylinder bores to securely seal therearound.

The gasket A is formed of an upper plate A10, a middle plate A11, and a lower plate A12, which are laminated together to extend substantially throughout an entire area of the gasket.

The upper plate A10 includes a base portion A10a, a curved portion A10b extending from the base portion A10a to define the cylinder bore Hc, and a flange A10c extending from the curved portion A10b and located under the base portion A10a. Also, the upper plate A10 includes a peripheral bead A15 extending along the periphery of the gasket A.

The peripheral bead A15 is a stepped bead formed of two bent portions A15a, A15b and an elongated portion A15c between the two bent portions. Also, the peripheral bead A15 includes an upper bead section A15d located in the upper side U, and a lower bead section A15e located in the lower side D. The width W1 at the upper bead section A15d is wider than the width W2 at the lower bead section A15e. The widths of the sections between the upper and lower bead sections A15d, A15e gradually change. the height of the peripheral bead A15 is the same throughout the entire length thereof.

The middle plate A11 is located under the base portion A10a, and includes beads A11a around the water holes Hw and beads A11b around the oil holes Ho (FIG. 1). The spring constant of the bead A11a in the lower section D is greater than that of the bead A11a in the upper section U. The middle plate A11 is not laminated to the flange A10c.

The lower plate A12 is located under the middle plate A11, and includes a bead A12a around the cylinder bore Hc. The bead A12a is located between the flange A10c and the base portion A10a. Also, the lower plate A12 includes a peripheral bead A16, which is a stepped bead extending around the periphery of the lower plate A12 similar to the peripheral bead A15. However, the bead A16 is constant and does not change the width and height throughout the entire length thereof.

For example, the gasket is formed such that the ratio of the area of the upper portion U and that of the lower portion D is 4:3; and the width W1 is 1 mm, and the width W2 is 0.75 mm (W1:W2=4:3). The height does not change throughout the entire length.

When the gasket thus prepared is situated between a cylinder head and a cylinder block (both not shown) and is tightened, the beads A12a, A11a, A11b are compressed to securely seal around the cylinder bores Hc, water holes Hw and oil holes Ho. At the same time, the peripheral beads A15, A16 are compressed as well. Since the width W1 at the upper bead section A15d is wider than the width W2 at the lower bead section A15e, the surface pressure at the upper bead section A15d is weaker than that at the lower bead section A15e.

Since the cylinder bores Hc are deviated and are located near the lower edge, when the gasket is tightened, the lower edge receives a higher tightening pressure than the upper edge. In the invention, the lower bead section A15e has a spring constant greater than that at the upper bead section A15d. Therefore, the high tightening pressure is supported by the lower bead section A15e with the high spring constant, while the lower tightening pressure is supported by the upper bead section A15d with the lower spring constant. Accordingly, the tightening pressure by the bolts is spread as a whole substantially equally throughout the entire area of the gasket A. Thus, the beads formed on the gasket A, especially the bead around the water holes Hw and oil holes Ho, can be compressed equally.

Namely, the tightening pressure of the bolt force/unit area at the upper section is lower than that at the lower section. However, since the spring constant of the bead section A15d is weaker than that of the bead section Al5e, the tightening pressure for the gasket throughout the entire area can become substantially equal. The beads around the water holes and oil holes can be compressed equally to thereby provide substantially equal surface pressure therearound.

In the gasket A, the spring constant of the bead A11a at the lower side D is formed greater than that at the upper side U, similar to the arrangement of the spring constant of the bead sections A15d, A15e. Generally, the arrangement of the spring constant is determined based on the ratio of the areas at the upper and lower sides U, D.

Figure 4:
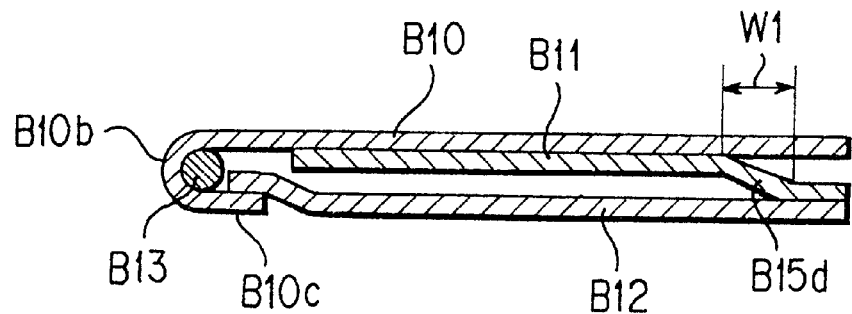
FIG. 4 is a sectional view, similar to FIG. 2, of a second embodiment of a cylinder head gasket of the invention.
Figure 5:
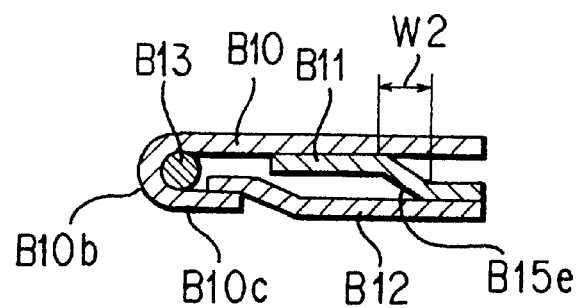
FIG. 5 is a sectional view, similar to FIG. 3, of the second embodiment of the invention.

FIGS. 4 and 5 show a second embodiment B of a cylinder head gasket of the invention. The gasket B is formed of an upper plate B10 with a curved portion B10b and a flange B10c, a middle plate B11, and a lower plate B12, similar to the gasket A.

In the gasket A, the bead A12a is provided in the lower plate A12, but the lower plate B12 in the gasket B does not have a bead. Instead, a wire ring B13 is formed around the curved portion B10b. Also, in the gasket A, the peripheral bead A15 is formed in the upper plate A10, but in the gasket B, a peripheral bead B15 (not shown) is formed in the middle plate B11. There is no peripheral bead in the lower plate B12.

Figure 6:
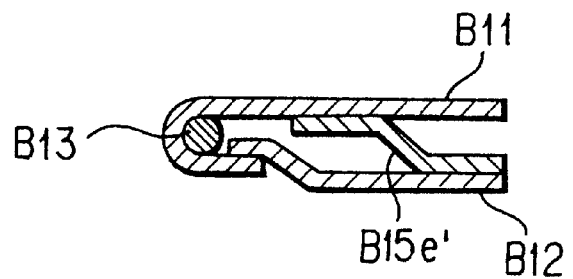
FIG. 6 is a sectional view, similar to FIG. 5, of a modified example of the invention.

The structure and arrangement of the peripheral bead B15 are the same as those of the bead A15. Namely, the width W1 of the upper bead section B15d is wider than the width W2 of the lower bead section B15e. The height of the bead at the lower bead section B15e' may be higher than that of the bead at the high bead section B15d, as shown in FIG. 6. When the gasket B is tightened, the upper bead section B15d provides a surface pressure lower than that of the lower bead section B15e. The strengths of the bead sections B15d, B15e are inversely proportional to the area ratio of the upper and lower sides. The gasket B operates as in the gasket A.

If a gasket formed of one metal plate is desired, only a metal plate A10 without the plates A11, A12 may be used. In this case, beads like the bead A12a may be formed on the base portion A10a around the fluid holes to seal therearound. The curved portion A10b and flange A10c can seal around the cylinder bore, and the beads seal around the fluid hole. Also, the peripheral bead A15 can provide surface pressures around the periphery of the gasket. The plate A10 may be combined with another plate to constitute a gasket with two metal plates. Therefore, the gasket with a desired plate number can be made in the present invention.

In the gasket of the invention, in case the cylinder bores are not arranged in the center of the cylinder head, the peripheral bead, which provides different surface pressures, is formed around the periphery of the gasket. Therefore, the tightening pressures applied to the sealing means for the fluid holes can be made substantially equal throughout the entire area of the gasket. Thus, the sealing means can securely seal around the fluid holes.

While the invention has been explained with reference to the specific embodiments of the invention, the explanation is illustrative and the invention is limited only by the appended claims.

What is claimed is:

1. A metal gasket for an internal combustion engine, said engine having at least one cylinder bore, bolt holes situated around the cylinder bore and fluid holes, said gasket comprising:

a first metal plate extending substantially throughout an entire area of the gasket to constitute a metal gasket and having a first side and a second side opposite to the first side, at least one first hole constituting the at least one cylinder bore and situated in the first metal plate to thereby provide an imaginary line extending through a center of the at least one first hole between the first and second sides, said at least one first hole being located closer to the first side than to the second side to thereby form a first area between the first side and the imaginary line, and a second area greater than the first area between the second side and the imaginary line, second holes constituting the bolt holes and situated in the first metal plate around the at least one first hole, and a first bead formed in the first metal plate and extending along an entire outer periphery of the first metal plate, said first bead having a first portion located near the first side and a second portion located near the second side, said first portion having a spring constant greater than that at the second portion to thereby provide a tightening pressure on the first metal plate as equal as possible.

2. A metal gasket according to claim 1, wherein said first bead is a stepped bead formed of two bending portions and a flat middle portion between the two bending portions.

3. A metal gasket according to claim 2, wherein said first bead has a width and height, said first portion of the first bead having at least one of the width narrower than that of the second portion and the height higher than that of the second portion.

4. A metal gasket according to claim 2, wherein said first metal plate includes a plurality of first holes arranged in one direction so that the first and second areas extend along said one direction.

5. A metal gasket according to claim 4, further comprising first sealing means formed around the respective first holes, third holes constituting the fluid holes and situated in the first and second areas of the first metal plate, and second sealing means formed around the third holes, said second sealing means located in the first area having a spring constant greater than that located in the second area.

6. A metal gasket according to claim 5, further comprising a second metal plate located under the first metal plate, said second metal plate having fourth holes corresponding to the first holes, second beads formed around the fourth holes as a part of the first sealing means, and a third bead situated around an outer periphery of the second metal plate under the first bead.

7. A metal gasket according to claim 6, wherein said third bead has a spring constant substantially same throughout an entire area thereof.

8. A metal gasket according to claim 7, further comprising a third metal plate situated between the first and second metal plates.

9. A metal gasket according to claim 5, further comprising a second metal plate disposed above the first metal plate and having said first sealing means, and a third metal plate disposed under the first metal plate, said first bead being sandwiched between the second and third metal plates.

10. A metal gasket according to claim 1, wherein said spring constants of the first and second portions of the first bead are determined based on a ratio of the first and second areas such that as the first area is narrower, the spring constant of the first portion increases.

11. A metal gasket according to claim 10, wherein said imaginary line extends substantially parallel to the first and second sides.

12. A metal gasket according to claim 11, wherein said spring constants gradually change at sections between the first and second portions of the first bead.

* * * * *

UNITED STATES PATENT AND TRADEMARK OFFICE
CERTIFICATE OF CORRECTION

PATENT NO.  : 5,961,126
DATED       : October 5, 1999
INVENTOR(S) : Yoshio Miyaoh It is certified that error appears in the above-identified patent and that said Letters Patent is hereby corrected as shown below:

In column 3, line 30, change "change. the height" to --change. The height--;
        line 62, change "weaker" to --less--;
        line 65, change "near" to --nearer--;

In column 4, line 6, after "Accordingly," add --due to the counterbalancing leverages--;
        line 14, change "weaker" to --less--;
        line 35, delete "(not shown)";

In column 5, line 14, change "constituting" to --corresponding to--;
        line 16, change "an imaginary" to --a--;
        line 20, delete "imaginary";
        line 22, delete "imaginary";
        line 23, change "constituting" to --corresponding to--;
        line 30, change "provide a" to --provide an equally distributed--;
        line 31, delete "as equal as possible";

In column 6, line 2, change "in one" to --along said line--;
        line 3, delete "direction";
        line 4, change "one direction" to --line--;
        line 7, change "constituting" to --corresponding to--; and

UNITED STATES PATENT AND TRADEMARK OFFICE
CERTIFICATE OF CORRECTION

PATENT NO. : 5,961,126
DATED : October 5, 1999
INVENTOR(S) : Yoshio Miyaoh

It is certified that error appears in the above-identified patent and that said Letters Patent is hereby corrected as shown below:

Col. 6, line 35, delete "imaginary".

Signed and Sealed this

Twenty-first Day of March, 2000

*Attest:*

*Attesting Officer*

Q. TODD DICKINSON

*Commissioner of Patents and Trademarks*